March 28, 1967  F. C. I. MARCHANT  3,310,951
JET PROPULSION ENGINES FOR AIRCRAFT
Filed July 19, 1965  5 Sheets-Sheet 1
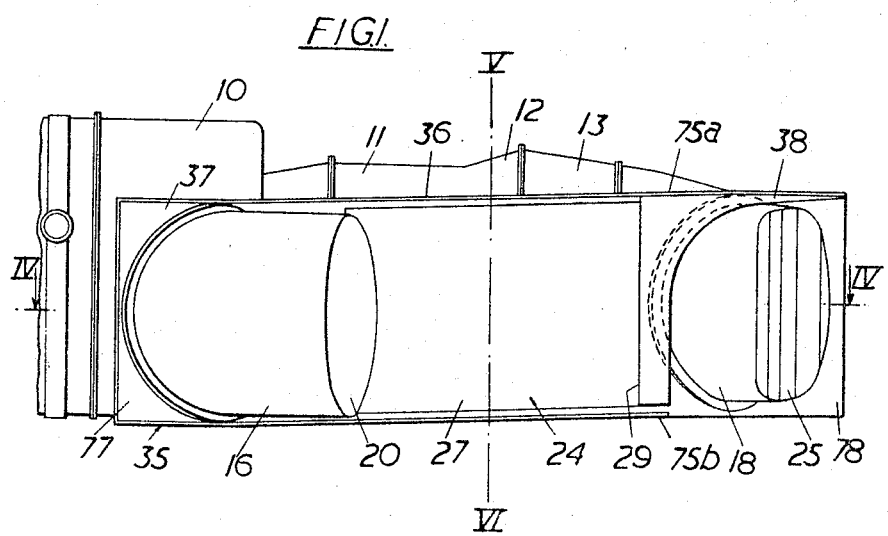
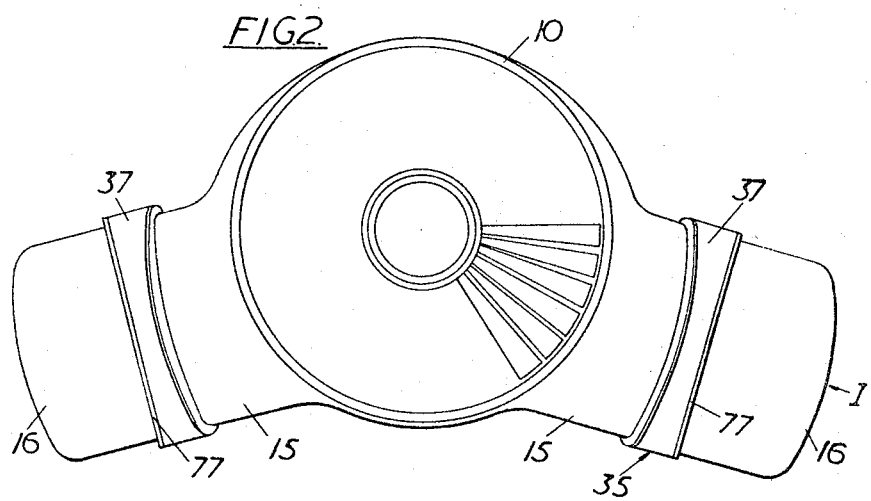
INVENTOR
FRANCIS CHARLES IVOR MARCHANT
BY
Bailey, Stephens + Huettig
ATTORNEYS

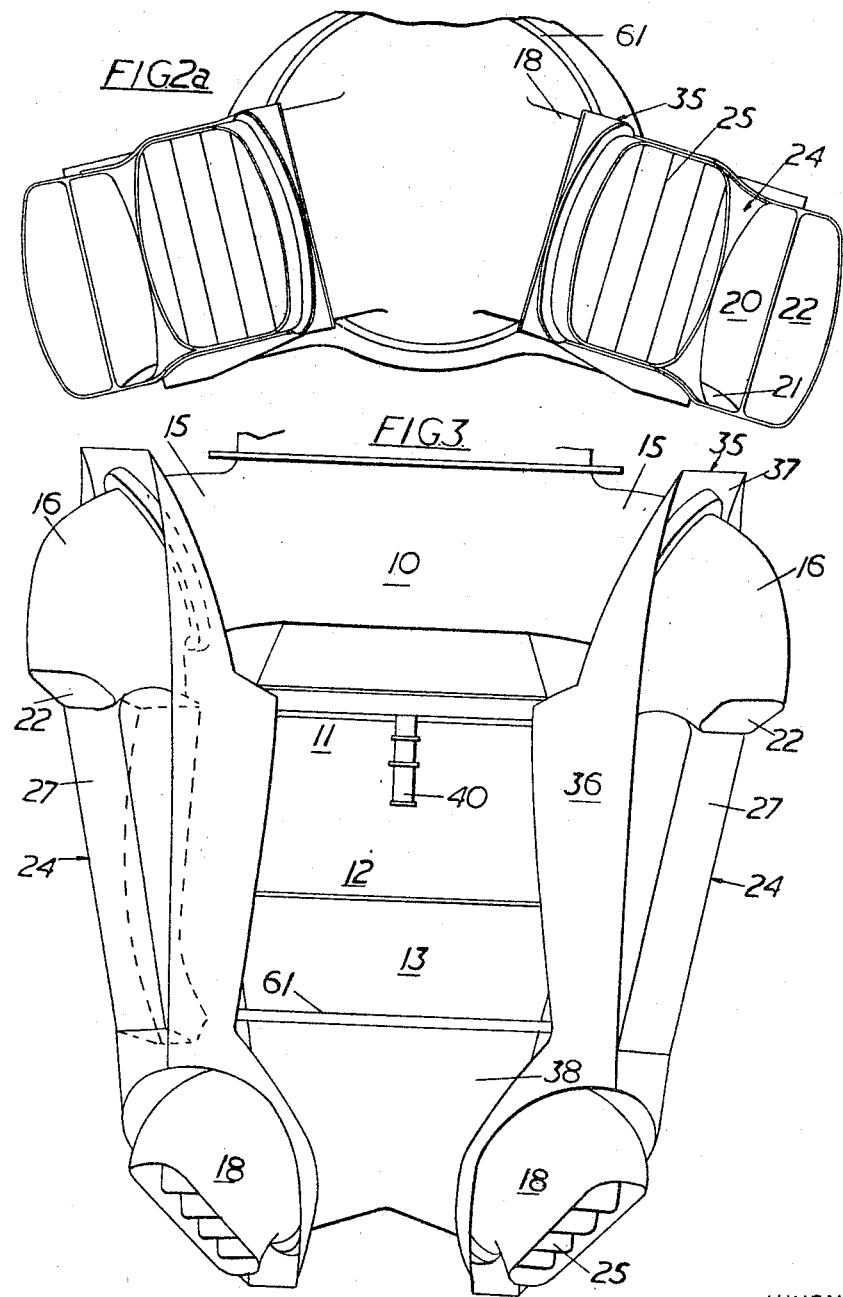

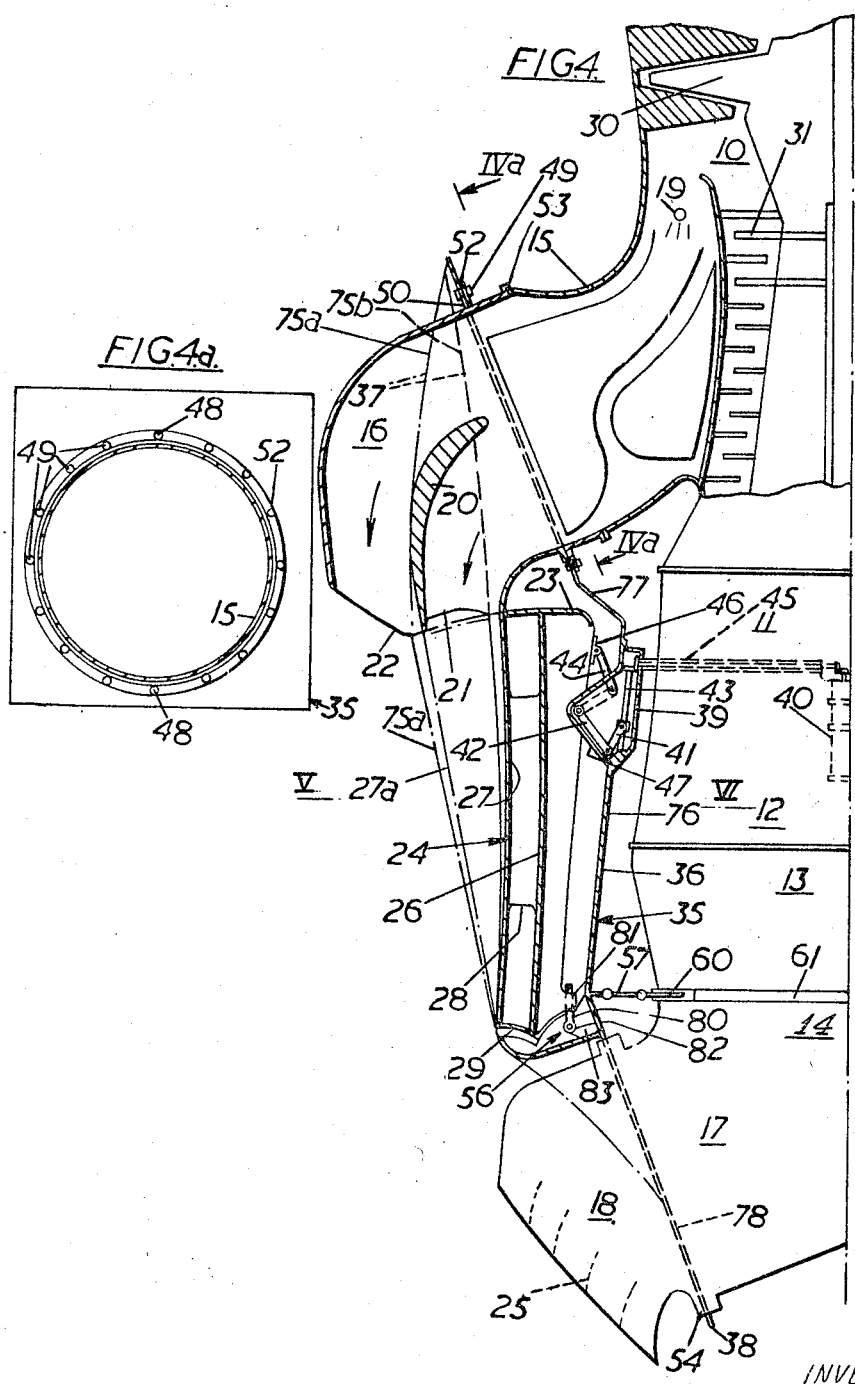

March 28, 1967  F. C. I. MARCHANT  3,310,951
JET PROPULSION ENGINES FOR AIRCRAFT
Filed July 19, 1965  5 Sheets-Sheet 4
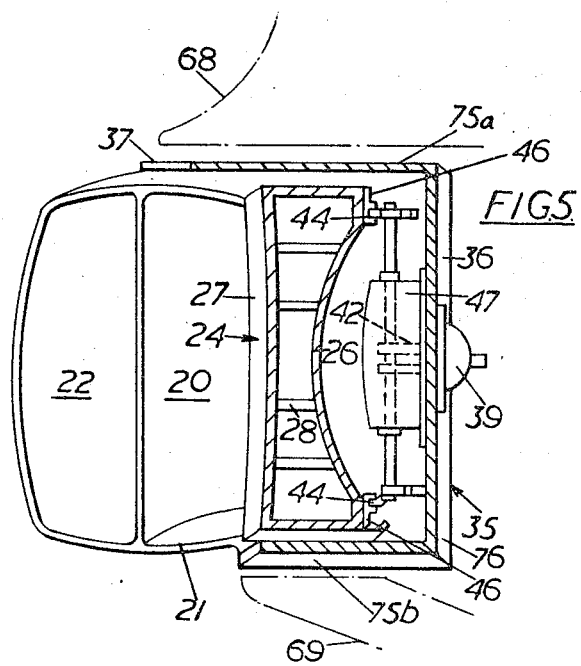
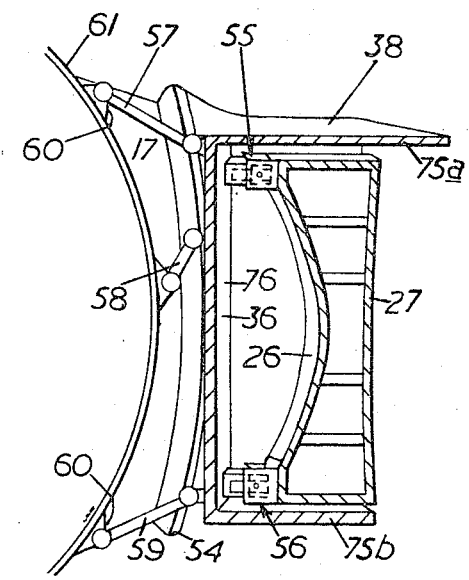
INVENTOR
Francis Charles Ivor Marchant
BY
Bailey, Stephens & Huettig
ATTORNEYS March 28, 1967     F. C. I. MARCHANT     3,310,951
JET PROPULSION ENGINES FOR AIRCRAFT
Filed July 19, 1965     5 Sheets-Sheet 5
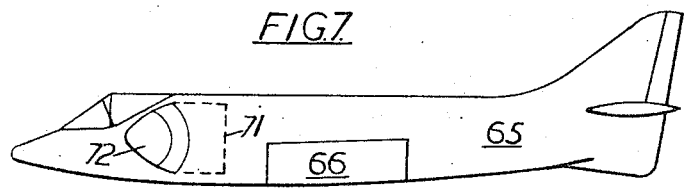
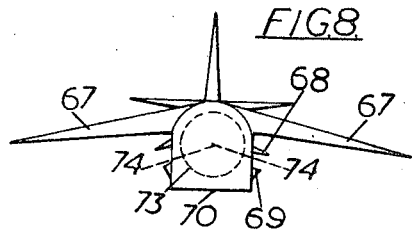
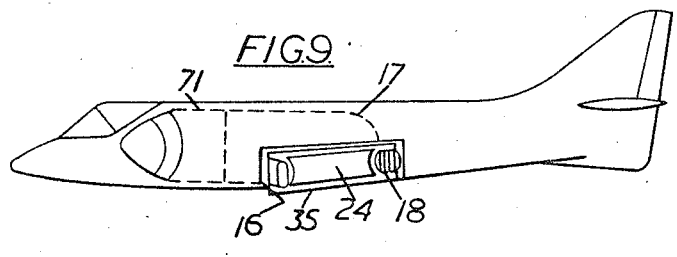
INVENTOR
Francis Charles Ivor Marchant
BY
Bailey, Stephens & Huettig
ATTORNEYS United States Patent Office 3,310,951
Patented Mar. 28, 1967

3,310,951
JET PROPULSION ENGINES FOR AIRCRAFT
Francis Charles Ivor Marchant, Bristol, England, assignor to Bristol Siddeley Engines Limited, Bristol, England, a British company
Filed July 19, 1965, Ser. No. 473,054
Claims priority, application Great Britain, July 21, 1964, 29,449/64
3 Claims. (Cl. 60—271)

It is known to provide a gas turbine jet propulsion engine for aircraft with at least one duct projecting from a side of the engine adjacent to the compressor system of the engine and arranged to be supplied with air compressed in the compressor system, the duct being connected to a propulsion nozzle of the kind which is rotatable to vary the direction of its discharge.

We have proposed to provide such an engine with means for burning fuel in the air flow to the nozzle in order to augment the propulsive thrust, a movable ramp which extends alongside the engine downstream of the nozzle, an obturator on the upstream end of the ramp which is selectively adjustable to mask partially the outlet of the nozzle in order to reduce its effective area when the nozzle is oriented to discharge past the outer surface of the ramp and fuel is not being burned in the air for the nozzle, and mechanism for moving the ramp and obturator between a retracted position close to the engine, and an extended position away from the engine for obtaining maximum reduction of the nozzle area. Such an arrangement is the subject of our United States patent application No. 212,407, now Patent No. 3,209,535.

In the above proposal the mechanism for moving the ramp was carried by the engine casing opposite the ramp. However, in aircraft operation, the loading on the ramp and obturator arising from aerodynamic forces exerted by the ambient airflow relative to the aircraft and by the propulsive jet from the nozzle, and also from the stresses on the ramp and obturator caused by thermal effects, and possibly by intense noise effects, demand not only a ramp and obturator of robust heat-resistant construction but concomitantly mechanism, including servomotor means, which is sufficiently powerful to move the ramp and obturator against such aerodynamic forces.

It has been found that, if the correspondingly powerful reaction forces from the ramp-operating mechanism are applied directly to the engine casing, they can cause distortion of the casing, which in turn may cause dangerous rubbing of the compressor or turbine rotor blade tips against their surrounding stator structure. This is especially true if the engine casing is made of an aluminium alloy to save weight and is split into halves along a diametral plane to facilitate assembly.

According to the present invention, a jet propulsion engine for aircraft comprises a duct projecting from a side of the engine, a propulsion nozzle connected to receive gas from the duct, a movable ramp arranged to guide the flow of gas rearwards from the nozzle and carrying an obturator which masks the nozzle outlet to an extent determined by the position of the ramp, and mechanism for moving the ramp, the ramp and mechanism being carried by a stiff support member which is secured to the duct so that a major portion of the forces exerted on the ramp and obturator by gas pressures are transmitted to the duct.

The invention is applicable primarily, but not exclusively, to gas turbine engines provided with front and rear ducts terminating in propulsion nozzles which project from a side of the engine and are arranged to receive respectively compressed air and exhaust gas from the engine, and in which the support member extends alongside the engine and is secured to the front duct.

The support member is preferably secured to a circular-sectioned portion of the duct and in such a manner that reaction forces are transmitted to the duct by the support member in a substantially tangential manner.

The support member is preferably of channel section into which the ramp and obturator are retracted.

Preferred details of the invention will now be described with reference to the accompanying drawings, of which:

FIGURES 1, 2, 2a and 3 are respectively a side view, front view, rear view, and view from below of a gas turbine engine, FIGURE 1 being seen in the direction of the arrow I in FIGURE 2;

FIGURE 4 is a section on the line IV—IV in FIGURE 1 and shows, on a larger scale, a part of the left-hand side of the engine;

FIGURE 4a is a section of a detail of FIGURE 4 on the line IVa—IVa;

FIGURES 5 and 6 are cross-sections along the plane V–VI in FIGURES 1 and 4, looking upstream and downstream respectively, with the ramp in its retracted position;

FIGURES 7 and 8 are respectively side and front diagrammatic views of an aircraft before the engine is installed; and FIGURE 9 is a side view corresponding to FIGURE 7 but with the engine installed.

Referring to FIGURES 1 to 6, a gas turbine jet propulsion engine, for vertical (or short) take-off and landing aircraft, comprises low and high pressure compressors 30, 31 housed in a section 10 of the engine casing, a main combustion system housed in a section 11, a turbine system housed in a section 12 for driving the compressors, and a turbine diffuser passage housed in a section 13. The output from the low pressure compressor is divided, part being delivered to the inlet of the high pressure compressor and part being ducted laterally outwards in two streams through left and right stub ducts 15 to a pair of elbow-form propulsion nozzles 16 mounted on the stub ducts. The turbine diffuser passage discharges into a jet pipe 14 forked to provide laterally extending branches 17 which carry at their outlet ends a pair of elbow-form propulsion nozzles 18. All four nozzles 16, 18 are rotatable to vary the direction of their respective discharges between rearwards for forward propulsion, downwards for vertical ascent or descent, and obliquely forwards and downwards for deceleration; an auxiliary combustion means 19 is provided between the low pressure compressor 30 and each of the front nozzles 16 for obtaining thrust augmentation when required.

Each front nozzle 16 has a single flow-deflecting vane 20 which divides the downstream portion of the nozzle interior into two discharge passages having outlets 21, 22. The vane 20 has a convex trailing edge which projects downstream of the nozzle passages for sealing purposes as will be explained later on. The combined area of both outlets is chosen to match the maximum flow condition when fuel is being burned at 19 upstream of the nozzle, and consequently the effective nozzle outlet area requires to be reduced when there is no such burning, or only limited burning.

This reduction in nozzle area is achieved, after the nozzle has been directed rearwards, by closing more or less completely the outlet 21, the closure member or obturator for this purpose being constituted by a concave part-cylindrical end wall 23 of a ramp 24. This ramp is swung about pivots 55, 56 at its downstream end, so as to cause the obturator 23 to obstruct all, part, or none of the outlet 21, as required. The shapes of the nozzle walls, including the trailing edge of the vane 20, and the shape of the obturator 23, are chosen so that the nozzle is rotatable to and from its rearward setting without fouling the obturator, and so that the ramp-borne obturator is pivotable to vary the effective cross-sectional area of the nozzle when the latter is directed rearwards, and so that the obturator is able to maintain during its operation a seal with the walls of the outlet 21.

Each of the four nozzles 16, 18 has a rotational axis which, with the engine considered as horizontal and facing forwards, is inclined rearwards and downwards so that the frontal area of the whole engine is as small as reasonably possible. The rear nozzles 18 are provided with a plurality of flow-deflecting vanes 25 and are of fixed outlet area.

Each ramp 24 is in general of box-section and oblong shape extending between the front and rear nozzles of one side of the engine. As mentioned previously, the upstream end wall which forms the obturator 23 is curved, whilst the downstream end which stops short of the rear nozzle has a curved surface 29. Inner and outer side walls 26, 27 of the ramp are connected together by transverse reinforcing members 28. As shown in dash-dot lines at 27a in FIGURE 4, the outer side wall 27 of each ramp in its outermost position provides a divergent reaction surface for a rearwards-directed jet from a partially-obstructed front nozzle, which surface forms a continuation in effect of the nozzle vane 20, and is slightly concave (FIGURE 5) in order to improve the effectiveness of the reaction surface in increasing the forward propulsion thrust exerted by the jet from the front nozzle. In the innermost position of the ramp, as shown in full lines in FIGURE 4, the obturator lies between the nozzle outlet 21 and the engine casing whilst the side wall 27 provides a slightly convergent reaction surface for the rearward jet. Above and below each ramp are fairings 68, 69 carried by the aircraft fuselage in which the engine is installed.

A support member 35 is located between the engine casing and each ramp. The principal functions of this member are the mounting of ramp-operating mechanism, including servomotor means, the transmission of a major portion of the loads arising from control of the ramp and obturator directly to the adjacent stub duct 15 so as to avoid transmission of such loads to the engine casing inboard of the support member, and the counterbalancing of a major portion of the nozzle thrust when the obturator is operative. The support member also assists in shielding the engine against the jet of combustion gas when the latter is issuing rearwards from the front nozzle.

Each of the two support members 35 is of outwards-facing channel section with a top flange 75a and a bottom flange 75b of smaller lateral extent (FIGURES 5 and 6). Each member 35 has an intermediate portion 36 which includes a web 76 and which extends between one of the stub ducts 15 and one of the jet pipe branches 17, an upstream portion 37 the web 77 of which is apertured to permit anchorage to the stub duct 15, and a downstream portion 38 the web 78 of which is likewise apertured to permit fitting around the branch 17. The webs 76, 77, 78 of the three portions 36, 37, 38 are in different planes (FIGURE 4), and the flanges 75a and 75b are tapered over the portions 37 and 38.

The portion 36 forms a recess into which the ramp and obturator are retracted when the obturator is not required. That surface of the web 76 of the portion 36 which faces the adjacent engine casing supports a recirculating ball screw jack unit 43, the housing 39 of which is firmly secured to the portion 36. The ball screw is actuated through a spline connection by bevel gears and shafting 45 driven from an air motor 40 mounted on an adjacent section of the engine casing, whilst the ball unit is connected to two links 41. The latter are respectively pin-jointed to upper and lower co-axial bellcranks 42 which in turn are each pin-jointed to one of two links 44. The links 44 are pivoted to upper and lower brackets 46 on the adjacent surface of the ramp side wall 26 (FIGURE 5). The outboard portion of the ramp-operating linkage is protectively housed in a hollow box 47 which projects from the support member towards the ramp; however the inward retraction movement of the ramp is not hindered by the box 47 because the latter is able to protrude into a recess formed by the concave shape of the ramp inner wall 26.

The upstream portion 77 of the web of each support member 35 has a circular hole which fits around the circular-section outlet portion of the stub duct 15 adjacent to a bearing housing 50 for the associated nozzle. The stub duct 15 has an annular flange 52 which abuts the portion 77 and is bolted to it by an annular series of bolts 48, 49. Those bolts 48 which are close to the top and bottom of the flanges are a tight fit in their holes; the remainder 48 have play in a radial direction. Thus loads in a longitudinal direction are transmitted substantially tangentially to the top and bottom of the stub duct, and have little tendency to deform the flange 52 out of true circular shape. On the other hand, all the bolts assist in fixing the support member stiffly in relation to loads exerted on it perpendicularly to the main axis of the engine. The stub duct is reinforced by an annular flange 53.

When the ramp is extended, so that the outlet 21 of the front nozzle is closed by the obturator 23, the forward thrust on the nozzle 16 which results from the rearward discharge of the jet is transmitted through the nozzle bearing to the stub duct 15, but this is partially counterbalanced by the rearwad thrust on the obturator 23 exerted by the gas pressure in the nozzle passage leading to the masked outlet 21, the counterbalancing thrust being transmitted by the ramp through its pivots 55, 56 to the support member 35 and thence tangentially to the stub duct through the bolted flange 52 adjacent to the nozzle bearing.

The downstream portions 38 of the support member surrounds with clearance the outlet portion of the jet pipe branch 17 adjacent to a bearing housing 54 for the associated nozzle 18. Thus the support member provides a downstream fairing as far as the rear side of the branch 17, but permits relative movement between the support member and the branch 17, caused for example by thermal expansion of the engine casing in the axial direction, without interfering with the relationship between the obturator and its associated front nozzle.

The downstream end of the ramp is hinged at top and bottom at 55, 56 by a pair of eye bolts 80, the shanks of which adjustably screw into threaded sockets formed in housings 81 which extend fore and aft along the ramp inner wall 26. The eye of each bolt engages around a part-spherical pin 82 which is held in the end of a forked bracket 83 secured to the web 76 of the support member. The support member is supported by swinging struts 57, 58, 59 to mounting ring segments 60 on the rear flange 61 of the turbine section. The struts 57, 58, 59 lie tangentially to the rear flange 61 to reduce any risk of distortion of the engine casing and are adjustable in length to permit minor adjustments. The struts 57, 58, 59 are universally mounted so that they also permit the engine casing to extend or contract slightly in length without displacing the member 35.

The ramp-operating linkage 44, 42 and the screw-jack unit are mounted on the support member 35 so as to lie directly opposite that region of the ramp where in forward flight, with fuel burning upstream of the front nozzle and the ramp correspondingly retracted, the transverse reaction forces on the ramp are at a maximum.

The portions 36, 37 of the member 35 are of rigid construction which is sufficiently stiff not to deflect under normal operational loads, especially those transmitted through the ramp-operating linkage, so that the member 35 may be regarded as almost cantilever-supported from the stub duct. This helps to ensure that the reaction forces on the rear struts 57, 58, 59 and therefore on the engine flange 61 are kept as small as possible. This in turn helps to avoid an otherwise possible cause of local distortion of the engine casing.

Because each branch 17 does not have a load-transmitting connection with a support member 35, the forked jet pipe 14 may be made of relatively light construction and thus more easily designed to withstand high pressure and thermal loads.

Referring also to FIGURES 7, 8 and 9, the central section of a fuselage 65 of a winged aircraft is cut away to provide a recess 66 for the engine described above. The wings 67 are omitted in FIGURES 7 and 9 for clarity, as also the fairings 68, 69.

The engine is installed by removing a bottom tray 70 from the aircraft, inserting the engine—complete with its four nozzles, two ramps and two support members— into the recess 66 from beneath the aircraft, securing the engine in position, connecting up the fuel lines and other services including connecting the compressor inlet through air intake ducting 71 to side intakes 72, and finally replacing the bottom tray 70 to complete the undersurface of the fuselage. In FIGURE 8 the engine casing is denoted 73, and 74 denotes the inclined rotational axes of the front nozzles 16.

With the engine installed, the side openings of the recess 66 are substantially closed off by the support members 35 which form, as it were, bulkheads between the engine proper and the ramps 24. A sealing flange (not shown) may extend around each bulkhead 35 to form a continuous seal between the bulkhead and the surrounding adjacent structure of the fuselage.

The engine is installed in the region of the centre of gravity of the aircraft, and for vertical take-off under maximum power all four nozzles are rotated downwards and fuel is burned upstream of the front nozzles to augment the thrust. After take-off the nozzles may be rotated rearwards to effect transition to forward flight. When fuel burning upstream of the front nozzles is stopped, the ramp-operating mechanism is actuated to move the ramps outwards and thereby cause the obturators 23 to mask the outlets 21 and so reduce the effective outlet area of the front nozzles. If maximum forward thrust is required, the ramps are retracted to leave the front nozzles completely unmasked.

I claim:
1. A jet propulsion engine for aircraft comprising a duct projecting from a side of the engine, a propulsion nozzle connected to receive gas from the duct, a support member extending rearward from the duct, means securing the support member to the duct, means linking the rear end of the support member to the side of the engine in rear of the duct, a movable ramp arranged to guide the flow of gas rearward from the nozzle and carrying an obturator which masks the nozzle outlet to an extent determined by the position of the ramp, means pivotally mounting the ramp on the support member, and mechanism, mounted on the support member, for moving the ramp.

2. An engine according to claim 1 including a flange on the duct and an annular series of bolts passing through holes in the support member and the flange, those of said bolts which are close to the top and bottom of the flange being a tight fit in their holes, while the remainder have play in a radial direction.

3. An engine according to claim 1, in which a rear portion of the support member is located relatively to the engine casing by universally mounted swinging struts, extending tangentially to the engine casing.

References Cited by the Examiner
UNITED STATES PATENTS
3,209,535   10/1965   Marchant et al. _____ 60—35.55

CARLTON R. CROYLE, *Primary Examiner.*